J. Close,
Wood Molding Machine.
N°. 49,981. Patented Sep. 19, 1865.
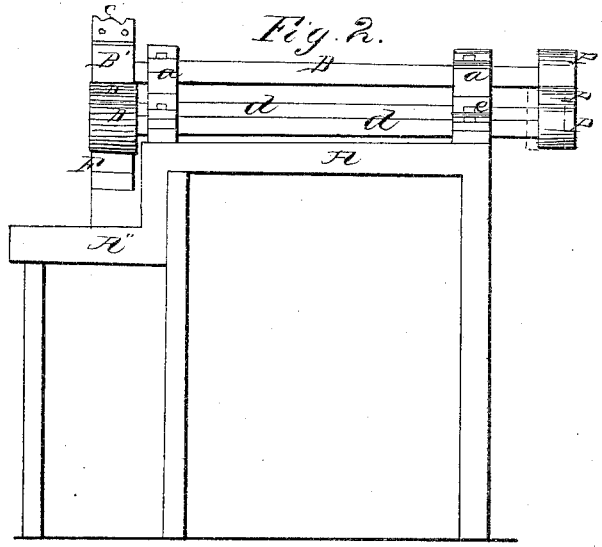
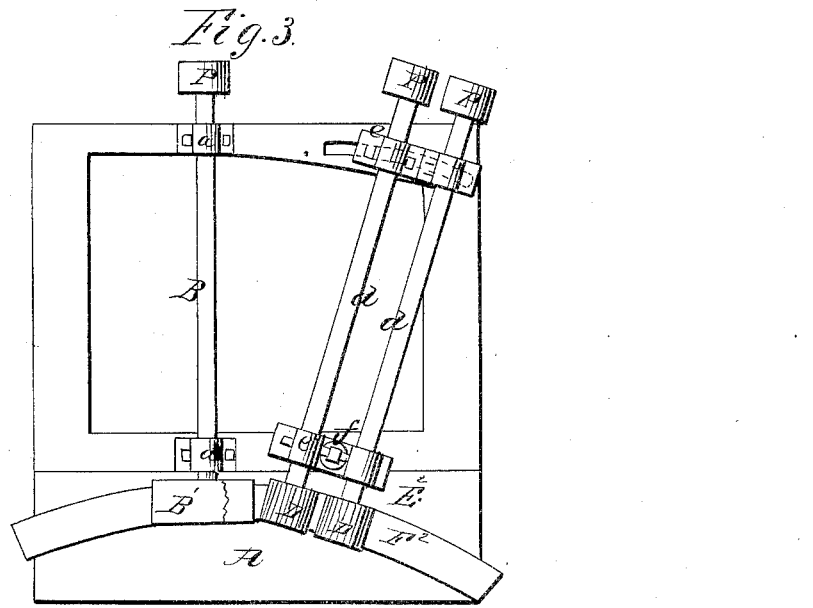
Witnesses
James G. Morgan
H. F. Reed
Inventor
Jeremiah Close

UNITED STATES PATENT OFFICE.

JEREMIAH CLOSE, OF BROOKLYN, NEW YORK.

IMPROVEMENT IN PLANING-MACHINES.

Specification forming part of Letters Patent No. 49,981, dated September 19, 1865.

*To all whom it may concern:*

Be it known that I, JEREMIAH CLOSE, of the city of Brooklyn, in the county of Kings, State of New York, have invented certain new and useful Improvements in Machines for Working Circular Moldings in Wood; and I do hereby declare that the following is a full, clear, and exact description of the same, reference being had to the accompanying drawings, making a part of my specification, in which—

Figure 1 represents a front-end view of machine. Fig. 2 shows a side elevation of same. Fig. 3 is a plan or top view, showing the adjustable feeding-rollers.

The object of my invention is to work moldings on either side, inside or outside, of any elliptical or circular form in wood.

My invention consists in the arrangement of the mechanism for feeding the wood to the cutters, so that it can be adjusted to press the molding and hold it firmly against the guide while being cut, so that whatever be the diameter of the circle or the radius of the segment the angle in which the feed-rollers bear upon it will guide it truly.

To enable others skilled in the art to make and use my invention, I will describe it more fully, referring to the drawings and to the letters marked thereon.

I make a frame, A A, of timber or of iron, in any suitable form, of any desired dimensions, the same being supported on legs A' A' A', on the front of which is placed a platform or table, A'', which falls below the top of the frame sufficient to admit of placing guides E to conform to the different curves of moldings to be worked.

On the top of the frame A A are fitted journal-boxes $a$ $a$, in which the shaft B runs, driven by the pulley P, which operates the molding-cutters B', this being a stationary fixture on the frame A A, as in ordinary planing or straight-molding machines.

For the purpose of holding the wood and feeding it up to the cutter I have two or more feed-rollers, D D, which may be serrated or roughened on their surface, they being placed on shafts $d$ $d$, and have their bearings in movable journal-boxes $e$ $e'$, the front box, $e$, being pivoted to the frame by a bolt, $f$, the rear journal-box, $e'$, being placed on the frame A, in which there is an opening or slot, $g$, so elongated as to allow the double journal-box $e'$ to be moved a considerable distance out of a direct line or parallel with the journals of the cutter-shaft B. Thus the shafts $d$ $d$ may be placed at such an angle in relation to the cutters that the serrated feed-rollers D D will have the tendency to draw the wood or molding being cut closely against the fan or guide E, they being adjusted to suit the various curves of the segments to be worked and seamed in their proper position by a thumb screw or nut on the bolts $h$ $h$, which pass through the slot $g$ in the frame and the journal-box $e$.

Having thus fully described my invention, what I claim as new, and desire to secure by Letters Patent, is—

The relative arrangement of the adjustable feed-rollers D D, the former or guide $E^2$, with the cutter-head B', and cutters $c$ $c$, when operated for the purposes substantially as described.

JEREMIAH CLOSE.

Witnesses:
 JAMES G. MORGAN,
 H. F. READ.